(12) United States Patent
Kohlberger et al.

(10) Patent No.: US 9,308,911 B2
(45) Date of Patent: Apr. 12, 2016

(54) METHOD FOR CONTROLLING THE TEMPERATURE OF A VEHICLE WITH AT LEAST A PARTIAL ELECTRIC DRIVE, VEHICLE AND CHARGING STATION

(71) Applicants:Robert Bosch GmbH, Stuttgart (DE); Samsung SDI Co., Ltd., Yongin-si, Gyeonggi-do (KR)

(72) Inventors: Markus Kohlberger, Stuttgart (DE); Johannes Biedert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 14/359,024

(22) PCT Filed: Sep. 17, 2012

(86) PCT No.: PCT/EP2012/068208
§ 371 (c)(1),
(2) Date: May 16, 2014

(87) PCT Pub. No.: WO2013/072094
PCT Pub. Date: May 23, 2013

(65) Prior Publication Data
US 2014/0316630 A1 Oct. 23, 2014

(30) Foreign Application Priority Data
Nov. 17, 2011 (DE) .......... 10 2011 086 569

(51) Int. Cl.
*B60L 9/00* (2006.01)
*B60W 10/30* (2006.01)
(Continued)

(52) U.S. Cl.
CPC ............... *B60W 10/30* (2013.01); *B60L 1/003* (2013.01); *B60L 1/08* (2013.01); *B60L 3/0046* (2013.01);
(Continued)

(58) Field of Classification Search
CPC ......... B60L 1/003; B60L 1/08; B60L 3/0046; B60L 11/1816; B60L 11/1846; B60L 11/185; B60L 11/1861; B60L 11/1874; B60L 11/1875; B60L 2230/16; B60L 2240/34; B60L 2240/545; B60L 2240/642; B60L 2240/645; B60L 2240/66; B60L 2240/662; B60L 2240/665; B60L 2250/12; B60L 2250/20; B60L 2260/56; B60L 2260/58; B60L 2270/44; B60W 2510/246; B60W 2550/12; Y02T 10/7005; Y02T 10/7011; Y02T 10/7044; Y02T 10/705; Y02T 10/7088; Y02T 10/7291; Y02T 90/121; Y02T 90/128; Y02T 90/14; Y02T 90/16; Y02T 90/163; Y02T 90/169; Y04S 30/14
See application file for complete search history.

(56) References Cited

U.S. PATENT DOCUMENTS

2009/0123815 A1\* 5/2009 Alkemade et al. .............. 429/50
2010/0089669 A1 4/2010 Taguchi
(Continued)

FOREIGN PATENT DOCUMENTS

DE 10 2010 036 994 A1 2/2011
GB 2 273 614 A 6/1994
(Continued)

OTHER PUBLICATIONS

International Search Report corresponding to PCT Application No. PCT/EP2012/068208, mailed May 15, 2013 (German and English language document) (7 pages).
(Continued)

*Primary Examiner* — Calvin Cheung
(74) *Attorney, Agent, or Firm* — Maginot, Moore & Beck LLP

(57) ABSTRACT

A method for controlling the temperature of a vehicle with at least a partial electric drive while the vehicle is connected to a charging station includes setting up a data link for bidirectional communication between the vehicle and charging station. Vehicle-side data is acquired with vehicle-side means for acquiring data, and charging-station-side data is acquired with charging-station-side means for acquiring data. Optimum temperature control parameters of the battery and passenger cell are determined using a logic by processing the acquired vehicle-side and charging-station-side data. The temperature control of the battery and of the passenger compartment of the vehicle is carried out with temperature control means. A motor vehicle and a charging station carry out the method.

10 Claims, 2 Drawing Sheets

(51) Int. Cl.
  *B60L 1/00* (2006.01)
  *B60L 1/08* (2006.01)
  *B60L 3/00* (2006.01)
  *B60L 11/18* (2006.01)

(52) U.S. Cl.
  CPC ........... *B60L 11/185* (2013.01); *B60L 11/1816* (2013.01); *B60L 11/1846* (2013.01); *B60L 11/1861* (2013.01); *B60L 11/1874* (2013.01); *B60L 11/1875* (2013.01); *B60L 2230/16* (2013.01); *B60L 2240/34* (2013.01); *B60L 2240/545* (2013.01); *B60L 2240/642* (2013.01); *B60L 2240/645* (2013.01); *B60L 2240/66* (2013.01); *B60L 2240/662* (2013.01); *B60L 2240/665* (2013.01); *B60L 2250/12* (2013.01); *B60L 2250/20* (2013.01); *B60L 2260/56* (2013.01); *B60L 2260/58* (2013.01); *B60L 2270/44* (2013.01); *B60W 2510/246* (2013.01); *B60W 2550/12* (2013.01); *Y02T 10/7005* (2013.01); *Y02T 10/705* (2013.01); *Y02T 10/7011* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2011/0091750 A1* | 4/2011 | Claypole et al. | 429/50 |
| 2012/0101659 A1* | 4/2012 | Kim et al. | 701/2 |
| 2012/0253568 A1* | 10/2012 | Uyeki | 701/22 |
| 2014/0309885 A1* | 10/2014 | Ricci | H04W 48/04 701/41 |

FOREIGN PATENT DOCUMENTS

| | | |
|---|---|---|
| JP | 6-225404 A | 8/1994 |
| JP | 9-46802 A | 2/1997 |
| JP | 2001-63347 A | 3/2001 |
| JP | 2009-303316 A | 12/2009 |
| JP | 2011-68348 A | 4/2011 |
| JP | 2011-517261 A | 5/2011 |

OTHER PUBLICATIONS

Barnitt et al.; Analysis of Off-Board Powered Thermal Preconditioning in Electric Drive Vehicles; 25th World Battery, Hybrid and Fuel Cell Electric Vehicle Symposium & Exhibition; Nov. 5-9, 2010; Shenzhen, China (10 pages).

* cited by examiner

METHOD FOR CONTROLLING THE TEMPERATURE OF A VEHICLE WITH AT LEAST A PARTIAL ELECTRIC DRIVE, VEHICLE AND CHARGING STATION

This application is a 35 U.S.C. §371 National Stage Application of PCT/EP2012/068208, filed on Sep. 17, 2012, which claims the benefit of priority to Serial No. DE 10 2011 086 569.1, filed on Nov. 17, 2011 in Germany, the disclosures of which are incorporated herein by reference in their entirety.

BACKGROUND

The present disclosure relates to a method for controlling the temperature of a vehicle with at least a partially electric drive while the vehicle is connected to a charging station. In addition, a vehicle and a charging station are described which are designed to carry out the method.

Lithium-ion batteries have played a key role in the electrification of the drive system. As is the case in most other electric energy stores, in lithium-ion batteries the efficiency and durability are also dependent on the temperature. At low temperatures, the charging capability and the extraction of energy are limited, whereas at high temperatures the energy store ages more quickly. However, the heating or cooling of the energy store consumes additional energy. Even in future battery technologies it is expected that there will be a certain dependence on temperature.

The comfort of the passenger compartment is also important for the passengers but active heating or cooling (air-conditioning system) during travel reduces the amount of energy from the electric energy store which is actually available for travel.

Therefore, there are already initial approaches which permit the temperature of the passenger compartment and the temperature of the energy store already to be set before departure. In this context, the temperature of the passenger compartment is usually selected manually by the customer. On the basis of the current ambient temperature (measured value of the vehicle outside temperature sensor) and the battery temperature it is determined whether it is necessary to heat the energy store.

A study by Robb A. Barnitt, Aaron D. Brooker, Laurie Ramroth, John Rugh and Kandler A. Smith (2010) Analysis of Off-Board Powered Thermal Preconditioning in Electric Drive Vehicles (NREL/CP-5400-49252) shows that such pre-conditioning of the vehicle significantly increases the range.

However, the success of such thermal preconditioning depends only partially on the parameters measured at the current position of the vehicle. A significant aspect of successful preconditioning are instead the parameters during the route traveled along.

SUMMARY

According to the disclosure, a method is made available for controlling the temperature of a vehicle with at least a partially electric drive. The vehicle is connected to a charging station during the temperature control. The vehicle is connected to the charging station if the preconditions are met for supplying the vehicle with electrical energy, that is to say for example the plug of a charging cable of the charging station is plugged into the charging socket of the vehicle. In addition to the temperature control of the battery and of the passenger compartment it is therefore also possible to charge the battery of the vehicle.

As a first step of the method according to the disclosure, a data link between the vehicle and charging station is set up in order to permit data to be exchanged between the vehicle and the charging station in the form of a bidirectional communication. This can take place, for example, via a radio link or a data cable. It is therefore possible for the charging station to interrogate data from the vehicle, or else for the vehicle to request data from the charging station.

As a second step of the method according to the disclosure, vehicle-side data is acquired with the vehicle-side means for acquiring data, and charging-station-side data is acquired with the charging-station-side means for acquiring data. In principle, all the data which can be acquired with vehicle-side means for acquiring data can be vehicle-side data. All types of sensors, as well as a navigation device or the Internet can serve as vehicle-side means for acquiring data. Analogous ideas apply to the charging-station-side data and to the charging-station-side means for acquiring data.

As a third step, optimum temperature control parameters of the battery and passenger compartment are determined using the acquired data which is processed by a logic means. The temperature control parameters are considered to be optimum why they can be used as a basis for controlling the temperature of the battery and the passenger compartment in such a way that the expected expenditure of energy for temperature control during travel is minimized. Possible temperature control parameters can be, for example, the temperatures of the battery and passenger compartment after the temperature control process has ended as well as the profiles of said temperatures over time. The logic means can be implemented in the form of algorithms which are capable of processing the supplied data. Said logic means can be stored either in the vehicle or in the charging station, for example in the form of suitable software and hardware.

As a fourth step, the temperature control of the battery and of the passenger compartment of the vehicle is carried out with the temperature control means. The temperature control of the passenger compartment is not meant to refer only to the temperature control of the air in the passenger compartment but also to the temperature control of installation components which are in thermal contact with the air, such as for example the internal trim of the passenger compartment cell. The energy necessary for temperature control originates from the charging station. The temperature control means comprise, on the one hand, means for controlling the temperature of the passenger compartment (for example blower, heater, air-conditioning device) as well as means for controlling the temperature of the battery (for example air or liquid temperature control, with or without a refrigeration machine). The temperature control of the battery and of the passenger compartment can in principle be carried out automatically (without further intervention), automatically after confirmation on the part of the user or manually. The automatic temperature control can be carried out by means of a plurality of basic settings (for example economy, normal and comfort) as well as profiles which are adapted to the region (central Europe, the tropics, desert, etc.). In the case of manual temperature control, the user can modify predetermined temperature control parameters or input them completely freely. In particular, manual temperature control of the passenger compartment can take place while the temperature control of the battery is carried out automatically (in turn with or without confirmation on the part of the user). In the case of manual temperature control, the optimum temperature control parameters are made available to the user—for example by means of a display. It is preferably also displayed to the driver to what extent the expected range is improved or worsened as a result of his settings.

The optimum passenger compartment temperature and battery temperature of the system can be determined by including multiple influencing variables with the method according to the disclosure. As a result, the electrical range and efficiency of the battery can be utilized to an optimum degree since during travel less energy has to be used for temperature control by the battery.

According to one preferred refinement of the disclosure, the method according to the disclosure additionally comprises a fifth step. In this step, the temperature control means are set in such a way that the temperature of the passenger compartment can be controlled in an optimum way during the following continued travel. As a result, the passenger compartment can be controlled in a way which is as economical in terms of energy as possible even during the further travel. In principle the same possibilities are applied to this step with respect to automatic or manual temperature control as are specified in step (IV), wherein in the case of the manual temperature control the optimum temperature control parameters are in turn displayed to the user.

The data which are acquired by the vehicle-side means for acquiring data preferably comprise at least one of the following points, wherein possible vehicle-side means for acquiring data are specified between parentheses:
  current temperature of the passenger compartment and of the battery (according to temperature sensors in the vehicle)
  instantaneous state of charge of the battery heating of the battery during the charging process is expected as a function of the energy which is fed in (according to the detection of the state of charge)
  currently selected desired temperature of the passenger compartment (according to the set values and the detected values of the air-conditioning system)
  data on the travel habits and comfort habits—driving style, usual behavior of the air-conditioning system, driving with the window open, etc. (recorded data and data stored in a memory)
  detection of unusual events such as, for example, a traffic jam, which cause a deviation from the normal use (from algorithms for detecting deviations from data acquired in normal use),
  destination or next charging station (data from the navigation system)
  preferred charging station (recorded data and data stored in a memory),
  outside temperature (according to vehicle outside temperature sensor)
  detecting whether persons are located in the vehicle during the charging process (detection of seat occupation, key transponder),
  temperature and weather at the destination at the arrival time and during the course of the journey (weather forecast data from the Internet if the vehicle can set up a connection to the Internet).

The data acquired by the charging-station-side means for data acquisition preferably comprises at least one of the following points, wherein possible charging-station-side means for data acquisition are specified between parentheses:
  ambient temperature of the charging station, for example inside a garage or a multistory car park (temperature sensor at the charging station)
  outside temperature and weather parameters at the location in the open air, for example outside the garage or the multistory car park (data from sensors which are linked in a network to the charging station and which measure the temperatures in the sun and the shade as well as precipitation and in addition can determine the current solar radiation averaged, for example, over the day and the intensity thereof, for example an existing weather station)
  temperature and weather at the destination at the arrival time and during the course of the journey (weather forecast data from the Internet),
  length of the distance to be traveled and selection of route-freeway, counting road etc.; positive and negative gradients etc. (data from map material from the Internet based on destination inputs from the vehicle).

In addition to the temperature of the battery and of the passenger compartment, the temperature of a latent heat accumulator is preferably also controlled. This latent heat accumulator stores thermal energy with as little loss as possible. During travel, the stored heat can be output when necessary and therefore heat the battery and/or the passenger compartment without reducing the electrical energy stored in the battery.

According to a further preferred refinement of the disclosure, the temperature control takes place during the charging process of the battery. As a result, the temperature of the vehicle is fully controlled when the charging process is ended. In particular, the temperature control takes place at or after the start of the charging process and ends before or at the same time as the end of the charging process.

However, if the vehicle is parked for longer than it is charged, the temperature control can preferably take place at least partially after the charging process of the battery. A possible preceding part of the temperature control can already take place during the charging process.

The battery is preferably a lithium-ion battery. By using lithium-ion technology it is possible to achieve particular high energy storage densities, which leads to further advantages particularly in the field of electric vehicle technology.

In addition, a vehicle and a charging station which are suitable for carrying out the method are made available. They comprise the means for data acquisition and are designed to exchange data bidirectionally with one another. In addition, at least the vehicle or the charging station comprises the logic means for determining the optimum temperature control parameters.

Advantageous developments of the disclosure are specified in the dependent claims or can be found in the description.

BRIEF DESCRIPTION OF THE DRAWINGS

Exemplary embodiments of the disclosure are explained in more detail with reference to the drawings and the following description. In the drawings.

DETAILED DESCRIPTION

Figure 1:
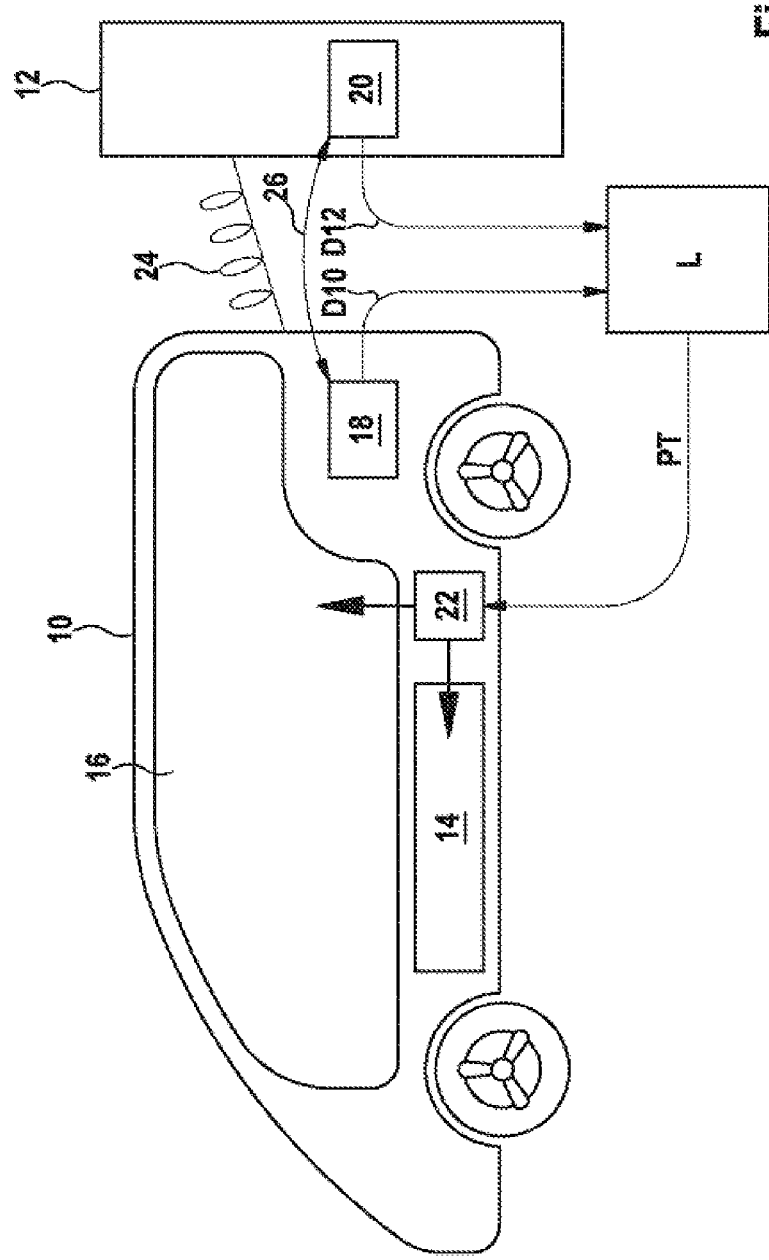
FIG. 1 shows a schematic illustration of the temperature control.

FIG. 1 shows a schematic illustration of the method according to the disclosure for controlling the temperature of a passenger compartment 16 and of a battery 14 of a vehicle 10 while the vehicle 10 is connected to a charging station 12, for example via a charging cable 24. The vehicle comprises vehicle-side means 18 for acquiring data, while the charging station comprises charging-station-side means 20 for acquiring data. Temperature control means 22, which are designed to control the temperature of the battery 14 and the temperature of the passenger compartment 16 independently of one another are arranged in the vehicle.

Initially, a data link 26 for bidirectional communication is set up. The vehicle 10 and the charging station 12 can communicate with one another via this data link 26 and therefore request or exchange data, wherein the data link 26 can be implemented, for example, as a cable link or radio link. In the next step, the vehicle-side means 18 for acquiring data determine the vehicle-side data D10 and the charging-station-side means 20 for acquiring data determine the charging-station-side data D12. Said data is in turn transmitted to a logic means L. The logic means L can be operated for example in the vehicle 10 or in the charging station 14 on suitable hardware. The objective of the logic means L is to evaluate in the third step all the available data 18, 20 with suitable algorithms in order to arrive as a result at optimum temperature control parameters PT. The temperature control parameters PT serve as an input variable for the temperature control means 22, which can subsequently carry out optimum temperature control of the battery 14 and of the passenger compartment 16. The temperature control is indicated schematically by means of the arrows starting from the temperature control means 22 into the battery 14 and the passenger compartment 16, wherein the flow of heat can be directed in both directions after cooling or heating of the battery 14 and of the passenger compartment 16. The temperature control can either take place fully automatically or after manual confirmation or inputting.

Figure 2:
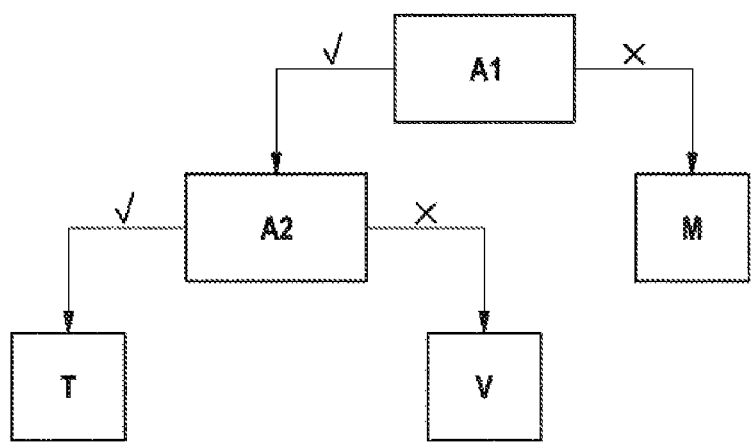
FIG. 2 shows a schematic illustration of the means of arriving at a decision as to whether the temperature control of the passenger compartment is to be restricted to ventilation of the passenger compartment.

If it is detected on the basis of the vehicle-side data D10 that windows were open for some of the time during the travel, the temperature control of the passenger compartment 16 can be limited to operating the passenger compartment ventilation (only blower without cooling or heating). This reduces the power demand at the charging station and leads to no appreciable decreases in comfort since it can be expected that the vehicle driver will open the window again. FIG. 2 shows a schematic illustration of the means of arriving at a decision as to whether the temperature control of the passenger compartment 16 is to be limited to purely ventilating the passenger compartment 16. At first, the first interrogation A1 occurs, which checks whether at the time in question all the windows are closed. If at least one window is to be opened, a message M is issued to the driver. If all windows are closed, the second interrogation A2 occurs which checks on the basis of the recorded data whether during the journey all the windows were mainly closed. If this is the case, the inventive temperature control of the passenger compartment 16 and of the battery 14 takes place. If this is not the case, that is to say if the driver drove with the window open, the temperature control of the passenger compartment is restricted to operation of the passenger compartment ventilation.

Below, three examples are given in order to demonstrate the way in which the method according to the disclosure functions.

Example 1

On a sunny hot summer's day, the charging station 12 is located in shadow. The passengers leave the vehicle 10 during the charging process. If the temperature control parameters were determined alone on the basis of temperature sensors positioned at the vehicle 10 or at the charging station 12, too low a value would be determined for the cooling requirement for the passenger compartment 16 and the battery 14. However, an additional temperature sensor in the sun supplies additional information relating to the heating which the vehicle 10 will very probably experience during the further travel. From further recorded vehicle-side data D10 it is known that during travel to the charging station 12 the air-conditioning system was active and all the windows were closed, for which reason the passenger compartment 16 is cooled during the charging process. This temperature control of the passenger compartment 16 is, however, stopped briefly before the end of the charging process or briefly before the planned further travel so that the air temperature which is sensed by the passengers is not unpleasantly cold but nevertheless the seats and the interior parts are cooled.

Example 2

On a sunny spring day, the driver remains seated in the vehicle 10 during the charging process and the charging station 12 is in the open air in the sun. However, a second temperature sensor in the shade communicates to the charging station 12 and to the vehicle 10 if the outside temperature is lower than has been determined by the direct solar radiation. On the basis of the data of the navigation system it is additionally apparent that the destination of the journey is a winter sport's location. From data from the Internet it is also known that darkness will fall approximately halfway along the journey, which will lead to additional cooling. Likewise, a long uphill travel on a freeway is apparent from the Internet or from extended map material of the navigation device, which permits a strong battery loading to be expected. Owing to the determined data, a somewhat higher interior temperature for the vehicle than normal is proposed as the temperature control parameter, but the battery temperature is left close to the lower limit in order to avoid additional cooling during the high-speed uphill part of the journey. The adaptation of the temperature of the passenger compartment is carried out somewhat more slowly here than if there were no person located in the vehicle 10. This may occur, for example, by not directing temperature-controlled air directly onto the driver.

Example 3

It is winter and the temperatures are below freezing. The passengers leave the vehicle 10 while it is connected to a charging station 12 in an underground garage. By means of measurements of a weather station which is connected in a network to the charging station 12 it is known that the outside temperature is significantly lower than the temperature in the underground garage. For this reason, the battery 14 is heated. If a latent heat accumulator is present, maximum pre-control of its temperature is carried out. During the charging of the vehicle, the return of the shopping trolley and the payment for parking, the temperature of the passenger compartment is adjusted by temperature control to pleasant values by raising the air temperature and activating the seat heater, the steering wheel heater, the mirror heater, the windscreen heater etc. while the vehicle is still connected to the charging station. An accumulator vaporizer of the air-conditioning system which is possibly present is pre-charged so that the condensation on windows can be easily controlled when exiting the underground garage.

The invention claimed is:

1. A method for controlling the temperature of a vehicle with at least a partially electric drive while the vehicle is connected to a charging station, comprising:

setting up a data link configured for bidirectional communication between the vehicle and the charging station;

acquiring vehicle-side data with a vehicle-side device configured to acquire data and acquiring charging-station-side data with a charging-station-side device configured to acquire data;

predicting a usage of a temperature control device of the vehicle during a next trip of the vehicle based on the acquired vehicle-side data and the acquired charging-side data;

determining optimum temperatures for a battery of the vehicle and for a passenger compartment of the vehicle with a logic device based on the predicted usage of the temperature control device, the optimum temperatures being such that an energy usage of the temperature control device during the next trip is minimized; and operating the temperature control device to pre-set temperatures of the battery and of the passenger compartment to the optimum temperatures for the battery and for the passenger compartment before the next trip.

2. The method for controlling the temperature as claimed in claim 1, further comprising:

pre-setting the temperature control device to control the temperature of the passenger compartment during the next trip.

3. The method for controlling the temperature as claimed in claim 1, wherein the vehicle-side data comprise at least one of:

current temperature of the passenger compartment and of the battery, current state of charge of the battery, currently selected desired temperature of the passenger compartment, data on the travel habits and comfort habits, detection of unusual events, destination or next charging station, preferred charging station, outside temperature, detecting whether persons are located in the vehicle during the charging process, and temperature and weather at the destination at the arrival time and during the course of the journey.

4. The method for controlling the temperature as claimed in claim 1, wherein the charging-station-side data comprise at least one of:

ambient temperature of the charging station, outside temperature and weather parameters at the location, temperature and weather at the destination at the arrival time and during the course of the journey, length of the distance to be traveled and selection of route, and selected charging process.

5. The method for controlling the temperature as claimed in claim 1, further comprising:

operating the temperature control device to control a temperature of a latent heat accumulator.

6. The method for controlling the temperature as claimed in claim 1, wherein the operating of the temperature control device is carried out during a charging process of the battery.

7. The method for controlling the temperature as claimed in claim 1, wherein the operating of the temperature control device is carried out at least partially after a charging process of the battery.

8. The method for controlling the temperature as claimed in claim 1, wherein the battery is a lithium-ion battery.

9. A vehicle comprising:

an electric drive;

a battery configured to power the electric drive;

a passenger compartment;

a temperature control device configured to control a temperature of the battery and of the passenger compartment; and a controller configured to, while the vehicle is connected to a charging station:

set up a data link configured for bidirectional communication between the vehicle and the charging station;

acquire vehicle-side data with a vehicle-side device configured to acquire data and acquire charging-station-side data with a charging-station-side device configured to acquire data;

predict a usage of the temperature control device of the vehicle during a next trip of the vehicle based on the acquired vehicle-side data and the acquired charging-side data;

determine optimum temperatures for the battery and for the passenger compartment based on the predicted usage of the temperature control device, the optimum temperatures being such that an energy usage of the temperature control device during the next trip is minimized; and operate the temperature control device to pre-set temperatures of the battery and of the passenger compartment to the optimum temperatures for the battery and for the passenger compartment before the next trip.

10. A charging station for charging a vehicle having at least a partially electric drive, the charging station comprising:

a controller configured to, while the vehicle is connected to the charging station:

set up a data link configured for bidirectional communication between the vehicle and the charging station;

acquire vehicle-side data with a vehicle-side device configured to acquire data and acquire charging-station-side data with a charging-station-side device configured to acquire data;

predict a usage of a temperature control device of the vehicle during a next trip of the vehicle based on the acquired vehicle-side data and the acquired charging-side data;

determine optimum temperatures for a battery of the vehicle and for a passenger compartment of the vehicle with a logic device based on the predicted usage of the temperature control device, the optimum temperatures being such that an energy usage of the temperature control device during the next trip is minimized; and operate the temperature control device to pre-set temperatures of the battery and of the passenger compartment to the optimum temperatures for the battery and for the passenger compartment before the next trip.

\* \* \* \* \*